(12) United States Patent
Haugen

(10) Patent No.: US 6,216,668 B1
(45) Date of Patent: Apr. 17, 2001

(54) ENGINE PERFORMANCE MEASURING METHOD

(75) Inventor: David James Haugen, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/440,923

(22) Filed: Nov. 16, 1999

(51) Int. Cl.⁷ .................. F02D 13/04; G01M 15/00
(52) U.S. Cl. .................. 123/320; 73/119 A; 73/116
(58) Field of Search .................. 123/532, 322, 123/321, 320; 60/602, 600; 180/170; 73/119 A, 116

(56) References Cited

U.S. PATENT DOCUMENTS

| | | | |
|---|---|---|---|
| Re. 33,450 | * 11/1990 | Manzolini | 73/116 |
| 5,483,927 | * 1/1996 | Letang et al. | 123/41.12 |
| 5,647,318 | 7/1997 | Feucht et al. | 123/322 |
| 5,718,199 | * 2/1998 | Hu et al. | 123/322 |
| 5,733,219 | * 3/1998 | Rettig et al. | 123/322 |
| 5,816,665 | * 10/1998 | Burnett et al. | 123/322 |

* cited by examiner

Primary Examiner—Henry C. Yuen
Assistant Examiner—Mahmoud Gimie

(57) ABSTRACT

An internal combustion engine includes a plurality of cylinders, a plurality of fuel injectors, compression brake units operatively associated the cylinders, an engine speed sensor and an engine control unit (ECU) for controlling the fuel injectors and the compression brake unit as a function of at least sensed engine speed. A method of measuring performance of the engine includes running the engine at a specified speed under no load, setting to zero a rate of fuel flow delivered by a selected one of the fuel injectors associated with one of the cylinders associated with the compression brake unit, increasing by a first amount a rate of fuel flow delivered by the other of the fuel injectors so that the engine runs at the specified engine speed, activating the compression brake unit associated with the selected fuel injector so that the cylinder associated therewith absorbs power, and again increasing by a second amount a rate of fuel flow delivered by the other of the fuel injectors so that the engine runs at the specified engine speed. This second amount of fuel flow rate increase thereby represents a performance characteristic of the engine.

12 Claims, 2 Drawing Sheets

ENGINE PERFORMANCE MEASURING METHOD

BACKGROUND OF THE INVENTION

This invention relates to a method for measuring engine performance, and more particularly, an engine performance measuring method which utilizes the capabilities of an electronically controlled fuel injected engine with compression brake units.

Typically, engine performance has been measured by placing the engine in a test cell and connecting it to a dynamometer. Commercially available internal combustion engines are known which have an electronic control unit which controls fuel injectors and engine compression brake units. When activated, a engine compression brake system converts the engine from a power generating device into a power absorbing device. This power absorbing capability of the engine compression brake may be varied by activating different numbers of compression brake units. Each engine compression brake unit converts one or more cylinders of the engine into power absorbing units. It would be desirable to use the capabilities of engine compression brake units and electronic controls in order to measure engine performance without the need for a dynamometer.

SUMMARY OF THE INVENTION

Accordingly, an object of this invention is to provide a method for measuring engine performance without requiring a dynamometer.

A further object of the invention is to provide such a method which utilizes the capabilities of a fuel injected, compression brake engine which has an electronic control unit which controls fuel injection and compression braking.

These and other objects are achieved by the present invention, wherein an internal combustion engine includes a plurality of cylinders, a plurality of fuel injectors, compression brake units operatively associated the cylinders, an engine speed sensor and an engine control unit (ECU) for controlling the fuel injectors and the compression brake unit as a function of at least sensed engine speed. A method of measuring performance of the engine includes running the engine at a specified speed under no load, setting to zero a rate of fuel flow delivered by a selected one or more of the fuel injectors associated with the cylinders associated with the compression brake unit, increasing by a first amount a rate of fuel flow delivered by the other of the fuel injectors so that the engine runs at the specified engine speed, activating the compression brake unit associated with the selected fuel injectors so that the cylinders associated therewith absorbs power, and again increasing by a second amount a rate of fuel flow delivered by the other of the fuel injectors so that the engine runs at the specified engine speed. This second amount of fuel flow rate increase thereby represents a performance characteristic of the engine.

DESCRIPTION OF THE PREFERRED EMBODIMENT

Figure 1:
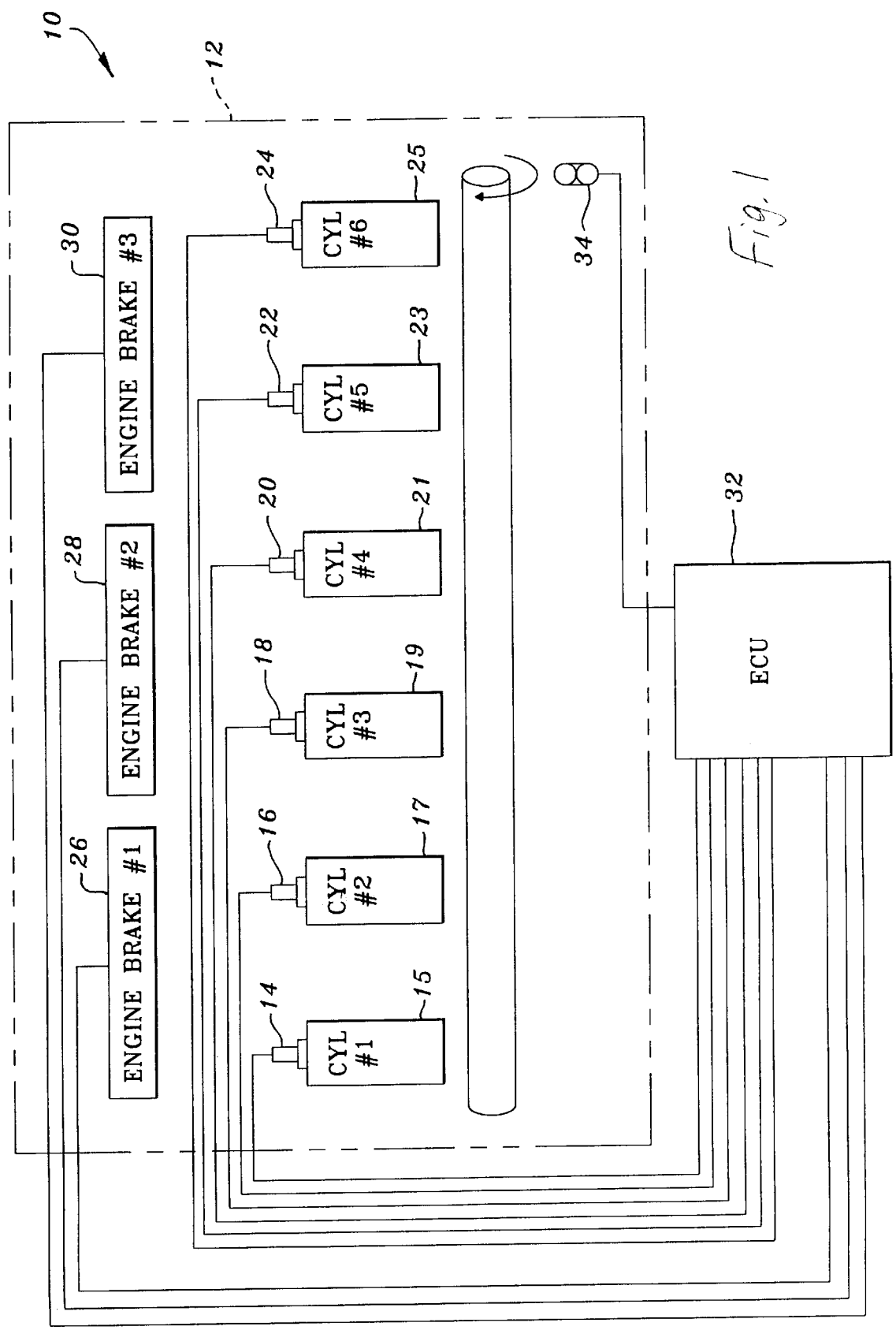
FIG. 1 is a simplified schematic diagram of an engine/compression brake control system with which the present invention may be employed.

An engine/control system 10, as seen in FIG. 1, includes an internal combustion engine 12, such as a conventional Diesel engine, with a plurality of fuel injectors 14, 16, 18, 20, 22 and 24, each associated with a corresponding engine cylinder 15, 17, 19, 21, 23 and 25. The engine/control system also includes a plurality of commercially available compression brake units 26, 28 and 30, each operatively associated with a corresponding pair of the cylinders. An engine control unit (ECU) 32 receives signals from various sensors, including a crankshaft sensor 34 which supplies engine speed and crankshaft position signals. ECU 32 supplies control signals to the fuel injectors 14–24 and the compression brake units 26, 28 and 30. With these components, engine performance can be measured by performing the following method. The pass/fail criteria for percent fueling will vary from engine to engine, depending upon the friction and brake efficiency of the engine.

The following conditions should exist before the method is performed. Vehicle speed must be set and remain at zero. The ECU 32 must be set to maintain a constant engine speed of, for example, 1500 rpm. The PTO (not shown) and the clutch (not shown) must be disengaged so that there is no load on the engine 12. The engine oil pressure must be within a specified range.

Figure 2:
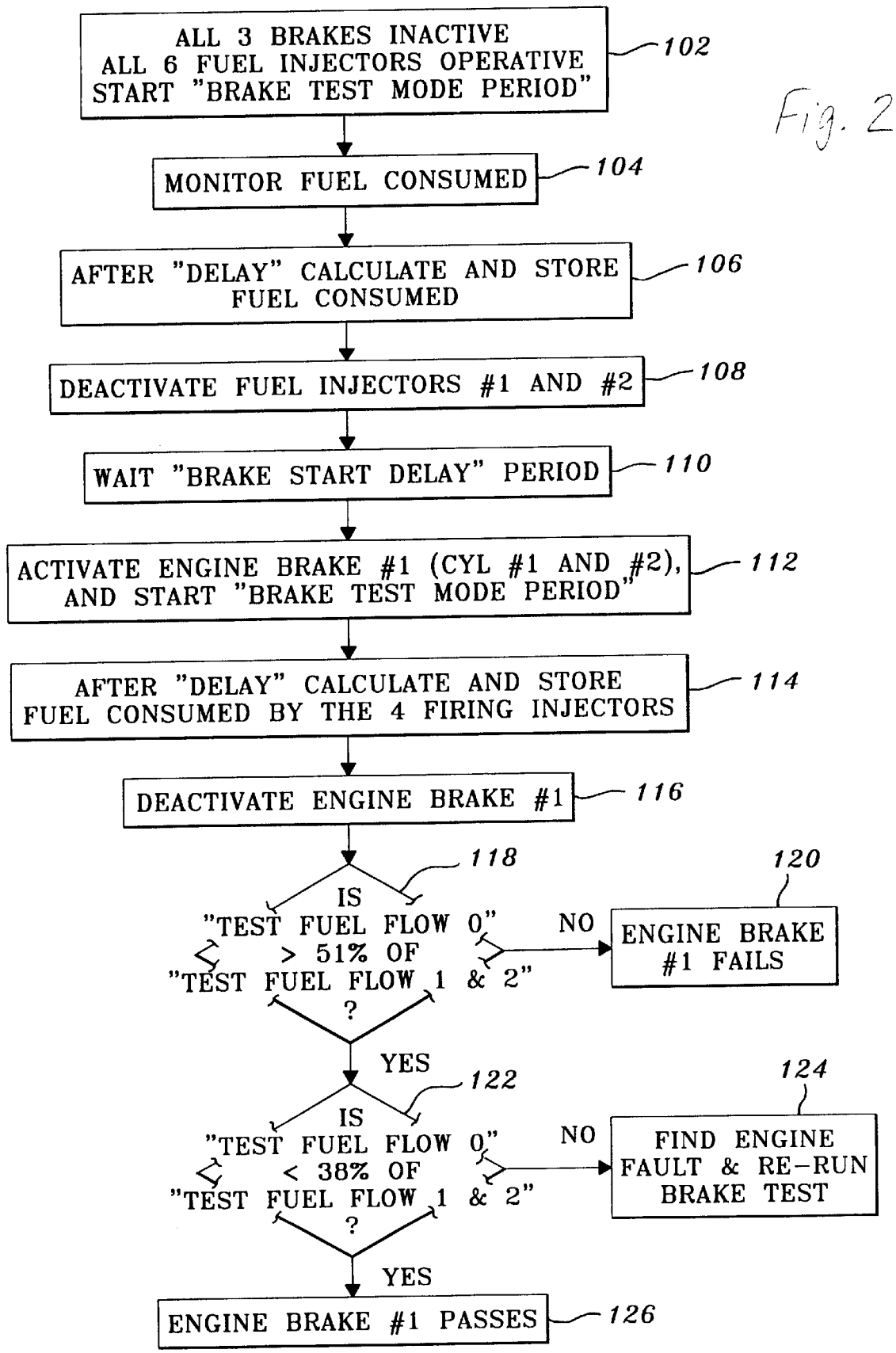
FIG. 2 is simplified logic flow diagram of the steps of the method of the present invention.

The method, as seem in FIG. 2, begins at step 102 which confirms that all three compression brake units 26–30 are inactive, that all six fuel injectors 14–24 are operative, and starts a Brake Test Mode Period timer. Then in step 104, the fuel consumed by all six injectors is monitored, and in step 106, after a Brake Test Averaging Delay time period, the fuel consumed by all six injectors during the Brake Test Mode Period is calculated and stored as "Test Fuel Flow 0".

Step 108 then deactivate fuel Injectors 14 and 16. Step 110 cause a delay for a "Brake Start Delay" time period. Step 112 then activate engine compression brake unit 26 (associated with injectors 14 and 16 and cylinders 15 and 17, and starts a "Brake Test Mode Period" timer.

Then, step 114, after a "Brake Test Averaging Delay" period, calculates the fuel consumed by the four firing injectors 18–24 during the Brake Test Mode Period and stores this result as Test Fuel Flow 1 & 2, after which step 116 deactivates engine brake unit 26.

Step 118 compares Test Fuel Flow 1 & 2 to Test Fuel Flow 0, and if Test Fuel Flow 0 is not greater than 51% of Test Fuel Flow 1 & 2 (in a typical engine), then step 120 determines that engine brake 26 has failed. Otherwise, step 122 is executed. If, in step 122, Test Fuel Flow 0 is not less than 38% of Test Fuel Flow 1 & 2, then step 124 determines that there is an engine fault and causes the test to be repeated, otherwise, step 126 determines that engine brake unit 26 is operating correctly. The foregoing illustrates the operation of the method for one of the brake units. To test all brake units and corresponding cylinders, steps 102–116 could be repeated for each brake unit, and then steps 118–126 repeated three times, once for each of the brake units 26, 28 and 30.

Then the ECU sets the fuelling flow rate of fuel injectors 14 and 16 (associated with engine compression brake unit 26) to zero, and increases the fuelling of remaining four injectors 18–24 in order to maintain the specified engine speed. Then, compression brake unit 26 is activated, and the ECU 32 is again allowed to increase the fuel flow rate of remaining four injectors 18–24 in order to maintain the specified engine speed. Thus, the amount fuel flow increase required to operate the pair of compression braked cylinders associated with injectors 14 and 16 is determined, and this second amount of fuel flow increase represents a performance characteristic of the engine. Because the rate of fuel delivered to each cylinder per engine cycle is roughly proportional to the power generated by each cylinder, the fuel flow rate signal from an electronic engine control unit can be used to represent the power generated by each cylinder. The conversion of the above described method into a standard computer program language for execution by the ECU 32, will be evident to one with ordinary skill in the art.

If the percent increase in fuel flow rate for injectors 18–24 does not exceed a predefined limit, two possibilities are the potential cause. First, the engine compression braking system is faulty, or second, the four power generating cylinders 19–25 are delivering less power than they should be generating. By cycling this test through the three compression brake units 26, 28 and 30, it can be determined if a particular pair of cylinders are low in producing power (since for each brake unit, a different pair of cylinders will be generating power), or if a particular compression brake unit is absorbing less power than it should be absorbing.

Thus, by using the ECU to monitor the fuel flow rate of the four power producing cylinders, while simultaneously activating the power absorbing operation of cylinders with a compression brake unit, the functionality of the engine compression brake system can be tested, and it can be determined if a pair of engine cylinders is producing less power then normal. This method does not require any additional equipment on the engine. It requires only the engine compression brake system and an engine control unit. This method can be used not only for a post-production test, but it can also be used to test performance in the field, such as in a field service mode for engine and compression brake diagnostics.

This method can be applied to any engine that has the capability of independently controlling the fuelling of some cylinders while simultaneously operating a engine compression brake on the other cylinders. Furthermore, this concept can also be applied to engines which have a separate engine compression brake for each cylinder. For example, in a six cylinder engine equipped with six engine compression brake units, if one brake is activated and the other five cylinders were supplied with fuel, the power delivered by the engine might normally be 68% to 71% of full power at the same engine speed. In a six cylinder engine equipped with engine compression brakes that activates two cylinders at a time, if the other four cylinders are fuelled, the power delivered by the engine might normally be 36% to 42% of full power at the same engine speed. In a six cylinder engine equipped with engine compression brakes which activate three cylinders at a time, then if the other three cylinders are fuelled, the power delivered by the engine might normally be 4% to 13% of full power at the same engine speed. In a six cylinder engine equipped with an engine compression brake which activates four cylinders at a time, the remaining two cylinders will typically be unable to provide enough power to exceed the power absorbed by the four braking cylinders. Similar calculations can be made for engines with more or less than six cylinders, and this invention is applicable to such engines as well.

The power absorption resulting from the activation of an engine compression braking unit is a function of the engine speed, the pressure in the intake manifold (not shown), the engine compression ratio, the lift-profile-timing of the camshaft (not shown) and the lash adjustment (not shown) of the compression brake unit. The only variable that changes with engine operation is the engine speed. For a given engine speed, a certain power absorption should occur for a pair of activated engine compression brake units.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A method of measuring performance of an internal combustion engine having a pluality of cylinders, a plurality of fuel injectors, each associated with a corresponding cylinder, at least one compression brake unit operatively associated with at least one of the cylinders, an engine speed sensor and an engine control unit (ECU) for controlling the fuel injectors and the compression brake unit as a function of at least sensed engine speed, the method comprising the following steps:

a) running the engine at a specified speed under no load;

b) reducing to zero a rate of fuel flow delivered by a selected one of the fuel injectors associated with one of the cylinders associated with the compression brake unit;

c) increasing by a first amount a rate of fuel flow delivered by the other of the fuel injectors so that the engine runs at said specified engine speed;

d) activating the compression brake unit associated with said selected fuel injector so that the cylinder associated therewith absorbs power; and e) increasing by a second amount a rate of fuel flow delivered by the other of the fuel injectors so that the engine runs at said specified engine speed, said second amount increase representing a performance characteristic of the engine.

2. The method of claim 1, further comprising:

repeating steps a)–e) for a different selected on of the fuel injectors.

3. The method of claim 1, further comprising:

while the engine is running at the specified speed under no load, calculating and storing a first test fuel value representing the fuel consumed by all the fuel injectors during a predetermined time period.

4. The method of claim 3, further comprising:

after the rate of fuel flow delivered by the other of the fuel injectors has been increased, calculating and storing a second test fuel value representing the fuel consumed by the other of the fuel injectors during said predetermined time period; and comparing the first test fuel value to the second test fuel value.

5. The method of claim 4, further comprising:

determining that the activated compression brake unit has failed if the first test fuel value is greater than a certain percentage of the second test fuel value.

6. The method of claim 4, further comprising:

determining that an engine failure has occurred if the first test fuel value is less than a predetermined percentage of the second test fuel value, said predetermined percentage being less than said certain percentage.

7. A method of measuring performance of an internal combustion engine having a plurality of cylinders, a plurality of fuel injectors, each associated with a corresponding cylinder, a plurality of compression brake units, each operatively associated with a pair of the cylinders, an engine speed sensor and an engine control unit (ECU) for controlling the fuel injectors and the compression brake units as a function of at least sensed engine speed, the method comprising the following steps:

a) running the engine at a specified speed under no load;
b) setting to zero a rate of fuel flow delivered by a selected pair of the fuel injectors associated with the cylinders associated with a selected one of the compression brake units;
c) increasing by a first amount a rate of fuel flow delivered by the other of the fuel injectors so that the engine runs at said specified engine speed;
d) activating the selected compression brake unit so that the pair of cylinders associated therewith absorb power; and
e) again increasing by a second amount a rate of fuel flow delivered by the other of the fuel injectors so that the engine runs at said specified engine speed, said second amount increase representing a performance characteristic of the engine.

8. The method of claim 7, further comprising:
repeating steps a)–e) for a different selected one of the compression brake units.

9. The method of claim 7, further comprising:
while the engine is running at the specified speed under no load, calculating and storing a first test fuel value representing the fuel consumed by all the fuel injectors during a predetermined time period.

10. The method of claim 9, further comprising:
after the rate of fuel flow delivered by the other of the fuel injectors has been increased, calculating and storing a second test fuel value representing the fuel consumed by the other of the fuel injectors during said predetermined time period; and
comparing the first test fuel value to the second test fuel value.

11. The method of claim 10, further comprising:
determining that the activated compression brake unit has failed if the first test fuel value is greater than a certain percentage of the second test fuel value.

12. The method of claim 10, further comprising:
determining that an engine failure has occurred if the first test fuel value is less than a predetermined percentage of the second test fuel value, said predetermined percentage being less than said certain percentage.

* * * * *